(No Model.)
J. H. STANSBURY & I. U. HYATT.
BARREL TRUCK AND JACK.
No. 423,188. Patented Mar. 11, 1890.
Fig. 1
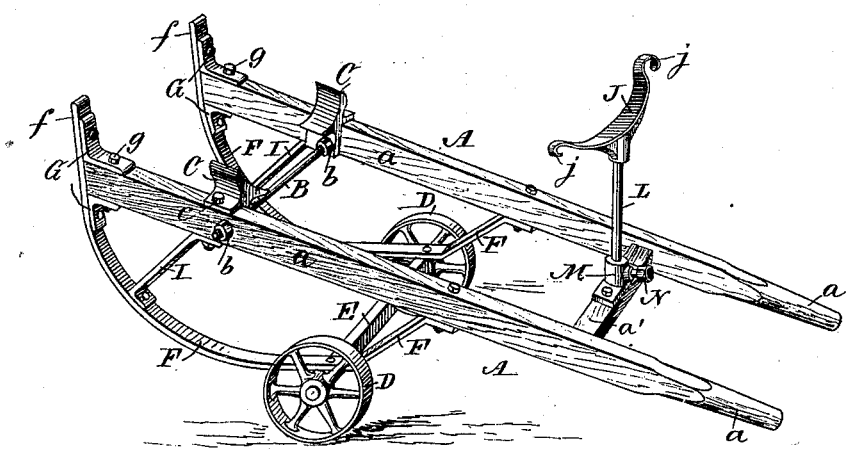
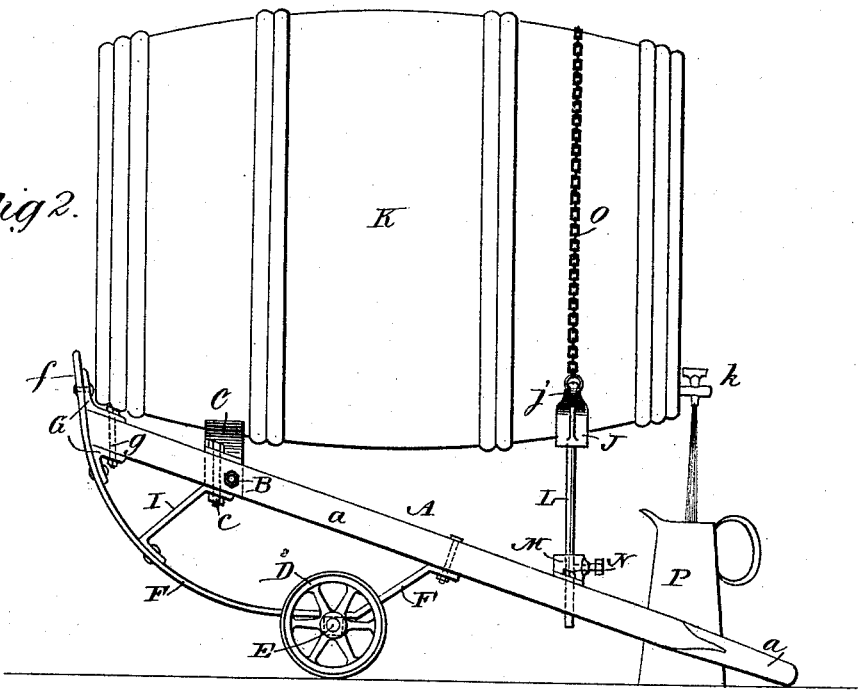
Fig. 2
Fig. 3
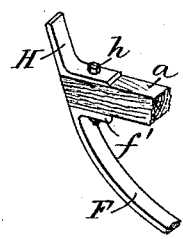
WITNESSES
Paul Johst
C. Sedgwick
INVENTOR:
J. H. Stansbury
I. U. Hyatt
BY Munn & Co.
ATTORNEYS.

UNITED STATES PATENT OFFICE.

JAMES H. STANSBURY, OF LAWRENCE, AND ISAAC U. HYATT, OF JAMAICA, NEW YORK.

BARREL TRUCK AND JACK.

SPECIFICATION forming part of Letters Patent No. 423,188, dated March 11, 1890.

Application filed October 26, 1889. Serial No. 328,238. (No model.)

*To all whom it may concern:*

Be it known that we, JAMES H. STANSBURY, of Lawrence, in the county of Queens and State of New York, and ISAAC U. HYATT, of Jamaica, in the county of Queens and State of New York, have invented a new and Improved Barrel Truck and Jack, of which the following is a full, clear, and exact description.

Our invention relates to a hand-truck for barrels containing molasses, oils, or other merchandise to be drawn off or retailed from the original packages; and the invention has for its object to provide a simple, efficient, and durable truck of this character by using which the labor of handling and placing the barrel or hogshead in convenient position may be materially lessened, allowing one man to do quickly and with ease what it has required two or more men to do with considerable effort.

The invention consists in certain novel features of construction and combinations of parts of the barrel truck and jack, all as hereinafter described and claimed.

Reference is to be had to the accompanying drawings, forming a part of this specification, in which similar letters of reference indicate corresponding parts in all the figures.

Figure 1 is a perspective view of our improved barrel truck and jack. Fig. 2 is a side view thereof, illustrating its use as a jack to support a barrel or hogshead from which a liquid is to be drawn; and Fig. 3 is a detail perspective view of a modified arrangement of the fulcrum and nose plates of the truck.

We make the truck and jack frame A with two opposite side bars $a\ a$, connected near their handle ends by a cross-bar $a'$ and near their forward ends by a stay bolt or bar B, which is threaded at opposite ends, where it passes through the side bars and receives pairs of nuts $b$, one nut at each side face of each bar. We utilize the stay-bar and nuts to secure to the side bars two chocks or metal cleats C C, which are fitted to the tops and inner faces of the side bars and are curved at their inner upper faces to receive the rounding face of a barrel to be sustained by the jack. In connection with the stay-bolt B, which passes through the inner vertical flanges of the chocks C C and against which the inside bolts $b$ are screwed, we also use to fasten the chocks bolts $c$, which pass through the upper horizontal flanges of the chocks and vertically through the truck side bars, as shown in the drawings. The frame A is supported by a pair of wheels D D on an axle E, which is held in any suitable manner to fulcrum-plates F F, which at their rear ends are bent upward and bolted to the truck side bars $a\ a$ about at their centers. Forward of the truck-wheels the metal bars F F are gradually curved upward to the forward ends of the bars $a\ a$, where they are rigidly fastened.

In the preferred construction (shown in Figs. 1 and 2 of the drawings) the fulcrum-bars are extended upward over and past the ends of the truck-frame side bars, and are held thereto by upper and lower angle plates or irons G G, which are riveted or bolted to the fulcrum-bars above and below the frame side bars, to which the angle-irons are fastened by bolts $g$. By thus extending the fulcrum-plates F F above the truck-frame side bars they form nose-plates $f\ f$, adapted to be entered at two places beneath the chine of a barrel; but, if desired, the nose-plates may be formed by angle-iron plates H, secured to the tops and forward ends of the frame side bars $a\ a$ by a bolt $h$, which in this instance would also pass through an inbent flange $f'$ on the upper forward end of the fulcrum-bar F, as shown in Fig. 3 of the drawings. However the forward ends of the downwardly-curved fulcrum-bars F are fastened to the frame side bars, we prefer to place a brace I between each fulcrum-bar and the adjacent frame-bar $a$. The lower ends of these braces I are preferably flanged and rivet or screw fastened to the fulcrum-bars, and their upper ends will preferably be flanged and held to the frame-bars by the vertical bolts $c$, which hold the barrel-supporting chocks C to the bars. These brace-bars I are located to sustain the fulcrum-bars from the frame while the truck with the barrel is being rocked over on them into horizontal position and prior to the contact of the truck-wheels with the floor, and as hereinafter more fully explained.

On the handle part of the truck-frame A is supported a vertically-adjustable concaved saddle J, onto which and the chocks C C the barrel or hogshead K rests, as shown in Fig. 2 of the drawings. This saddle, which may be made of cast or wrought iron, is provided with a pendent stem or spindle L, which fits a hole bored in a cast-metal bearing-block M, which is provided with a set-screw N, which may be turned in against the spindle, by a wrench or otherwise, to fasten the saddle at any required vertical adjustment. At each end of the saddle J there is preferably formed a hook j, allowing connection of opposite ends of a stay-chain O, passed over the barrel to hold it snugly to the saddle while the truck is being tilted downward after inserting its nose-plates under the chine of the barrel. A rope, bail, or cord may be used instead of the chain, and the chain, rope, or cord may be connected in any suitable manner with the vertically-adjustable saddle.

The operation of our barrel truck and jack is very simple and effective, as follows: After the barrel or hogshead K, of molasses, oil, or other fluid, is rolled on its bilge to the place where it is to be jacked up for conveniently drawing off its contents the barrel will be set on end, and after the truck nose-plates f f or H are slipped under the barrel and the chain O is passed around it and caught into the opposite hooks j j of the saddle J, to hold it to the truck-chocks C C and to the saddle, the handle ends of the truck will be lowered to rock the truck-frame and barrel over forward on the fulcrum-plates F F until the truck-wheels D D touch the floor, and the truck and jack may then be easily trundled on the wheels either forward or backward, as may be required to back or run the barrel into the desired place, whereupon the truck-handles will be lowered to the floor to sustain the barrel in the position shown in Fig. 2 of the drawings, to allow the fluid to be drawn off through the barrel-spigot k into any suitable vessel or measure P placed below the spigot and between the handles of the truck and jack frame. As the contents of the barrel are nearly drawn off the saddle J may easily be lowered in its bearing and again tightened by the set-screw N to tilt the barrel forward to allow all it contains to flow automatically from the spigot.

We make special mention of the curved fulcrum-plates F on the truck-frame for taking firm hold of the barrel-chine at two places, and also affording a substantial rocker-fulcrum on which a very heavy barrel or hogshead may be tilted over forward with comparative ease by one man until sustained by the truck-wheels, and we also specially mention the relative arrangement of the truck and jack wheels with the rocker-fulcrums and with the nose-plates and barrel-supporting chocks and saddle, as the wheels are located behind the rocker-fulcrum portions of the plates F F and the nose-plates to cause the barrel or hogshead to almost balance on the truck-wheels and axle, or to overbalance forward but little, so that, while the barrel may be very easily tilted forward by one man on the rocker fulcrum-plates, it may also be lowered easily by him until the handle ends of the truck-frame rest on the floor to form supports and, with the wheels, to constitute a substantial jack for the barrel. It will also be noticed that the truck-frame bars a a are straight, which facilitates the cheap manufacture of the truck and jack.

We are not limited to the use of curved metal plates F F to form a rocker-fulcrum below the frame and forward of the truck-wheels, as wooden blocks may be used to form said rocker-fulcrum, as will readily be understood.

Having thus described our invention, what we claim as new, and desire to secure by Letters Patent, is—

1. A barrel truck and jack provided forward of its wheels with two curved side plates forming a rocker-fulcrum and extended above the frame to form separate nose-plates, which engage the barrel at two places while loading it, substantially as shown and described.

2. A barrel truck and jack constructed with a wheeled frame, barrel-supports thereon, and a rocker-fulcrum below the frame and forward of its wheels and consisting of two curved side plates extended above the frame to form two separate nose-plates, which engage the barrel at two places while loading it, said wheels being located relatively with the rocker-fulcrum and barrel-supports to cause the barrel to be easily tilted first on the rocker-fulcrum and then on the wheels, and to overbalance forward but little on the wheels as it is fully lowered to jack up the barrel, substantially as herein set forth.

3. In a barrel truck and jack, the combination, with the truck-frame and a vertically-adjustable barrel support or saddle provided with hooks at opposite ends, of a stay-chain connected to the saddle-hooks and passing over the barrel, substantially as herein set forth.

4. In a barrel truck and jack, the combination, with the frame having side bars a a, of chocks C C, a screw-threaded bolt B, passed through the side bars and chocks and provided with two pairs of nuts b, one pair at each end of the threaded bolt, and one nut at each side face of each bar, substantially as described, for the purposes set forth.

5. In a barrel truck and jack, the combination, with the frame side bars a a and rocker fulcrum-plates F F, extending above the frame side bars, of angle-irons G and bolts g, securing the plates to the bars, substantially as herein set forth.

JAMES H. STANSBURY.
ISAAC U. HYATT.

Witnesses:
JOSEPH H. REMSEE, Jr.,
ELKANAH G. BARTO.